(12) United States Patent
McCartney

(10) Patent No.: US 11,231,631 B2
(45) Date of Patent: Jan. 25, 2022

(54) METHODS, SYSTEMS, AND APPARATUS FOR CONSTRUCTING CUSTOMIZED DISPLAY PANELS

(71) Applicant: Richard McCartney, Scotts Valley, CA (US)

(72) Inventor: Richard McCartney, Scotts Valley, CA (US)

( * ) Notice: Subject to any disclaimer, the term of this patent is extended or adjusted under 35 U.S.C. 154(b) by 0 days.

(21) Appl. No.: 16/995,511

(22) Filed: Aug. 17, 2020

(65) Prior Publication Data

US 2021/0033936 A1 Feb. 4, 2021

Related U.S. Application Data

(63) Continuation of application No. 16/265,836, filed on Feb. 1, 2019, now Pat. No. 10,747,078.

(Continued)

(51) Int. Cl.
| | |
|---|---|
| *G02F 1/1345* | (2006.01) |
| *G02F 1/1362* | (2006.01) |
| *G02F 1/1333* | (2006.01) |
| *G09G 3/36* | (2006.01) |
| *G02F 1/1368* | (2006.01) |

(52) U.S. Cl.
CPC ...... *G02F 1/136286* (2013.01); *G02F 1/1333* (2013.01); *G02F 1/13336* (2013.01); *G02F 1/13452* (2013.01); *G02F 1/13458* (2013.01); *G09G 3/3648* (2013.01); *G02F 1/1345* (2013.01); *G02F 1/1368* (2013.01); *G02F 1/13454* (2013.01); *G02F 1/133351* (2013.01); *G02F 1/136295* (2021.01); *G09G 2300/02* (2013.01); *G09G 2340/04* (2013.01)

(58) Field of Classification Search
CPC .......................... H01L 27/1214; H01L 27/124
USPC .............................................................. 438/3
See application file for complete search history.

(56) References Cited

U.S. PATENT DOCUMENTS

| | | |
|---|---|---|
| 2002/0118335 A1 | 8/2002 | Tannas |
| 2016/0172428 A1* | 6/2016 | Song ................... H01L 27/3276 257/99 |

FOREIGN PATENT DOCUMENTS

WO 2017155222 A1 9/2017

OTHER PUBLICATIONS

European Patent Office Examiner: Ammerlahn, Dirk, Extended European Search Report for corresponding European Patent Application No. 19746792.1, Sep. 21, 2021, 10 pages.

* cited by examiner

*Primary Examiner* — Elias Ullah
(74) *Attorney, Agent, or Firm* — Vista IP Law Group LLP; William A. English

(57) ABSTRACT

The disclosed embodiments generally relate to a method, system and apparatus for forming a custom-sized display panel. An exemplary method to form a custom display from a large sheet of pixels includes: providing a sheet of pixels having a TFT substrate, a liquid crystal layer and a second substrate, the sheet of pixels having a first perimeter, the liquid crystal medium interposed between the TFT substrate and the second substrate; forming a display panel from the sheet of pixels, the display panel having a display panel perimeter, the second display having a first edge defined by the TFT substrate extending beyond the second substrate to thereby expose an electrical trace on the TFT substrate; sealing the liquid crystal layer on the first edge; conductively exposing the electrical trace on the TFT substrate; and forming a column driver line on the TFT substrate to communicate a driver signal to the second display.

12 Claims, 17 Drawing Sheets

Related U.S. Application Data

(60) Provisional application No. 62/624,998, filed on Feb. 1, 2018.

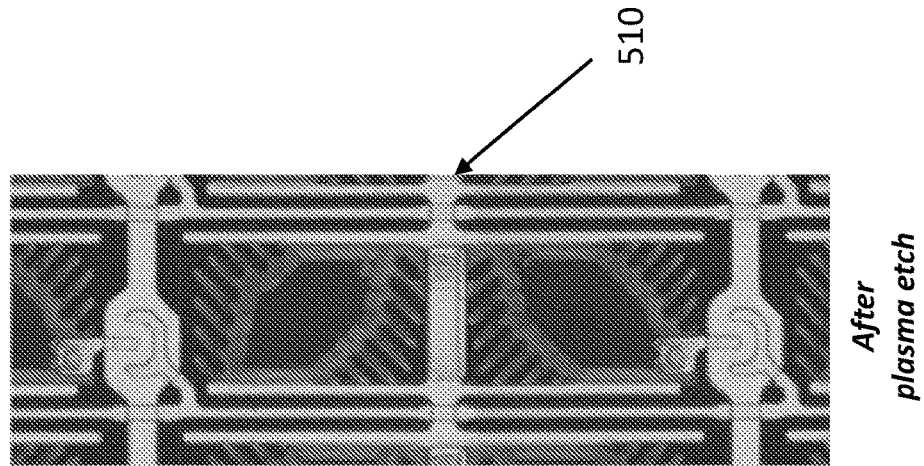
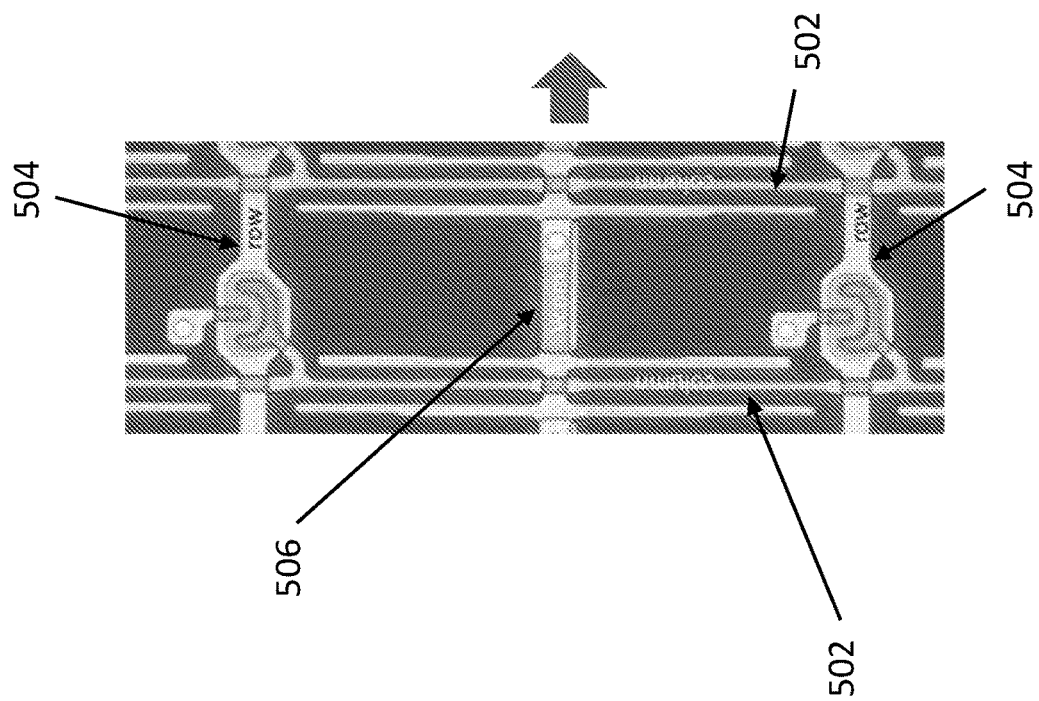

METHODS, SYSTEMS, AND APPARATUS FOR CONSTRUCTING CUSTOMIZED DISPLAY PANELS

RELATED APPLICATION DATA

The present application is a continuation of co-pending application Ser. No. 16/265,836, filed Feb. 1, 2019, and issuing as U.S. Pat. No. 10,747,078, which claims benefit of U.S. provisional application Ser. No. 62/624,998, filed Feb. 1, 2018, the entire disclosures of which are expressly incorporated by reference herein.

FIELD OF THE INVENTION

The disclosure generally relates to electronic displays. The disclosure relates to method, system and apparatus for constructing a customized display from a region excised from a sheet with pre-fabricated pixels.

BACKGROUND

The conventional methods for creating a custom-sized liquid-crystal display (LCD) begins with designing a specific mechanical layout including the number and layout of pixels in the active area as a single, indivisible, display unit. For example, a forty-six-inch diagonal display panel having an array of 3,840 pixels horizontally and 2,160 pixels vertically might be used as the display device in a forty-six-inch color television. The pixels are most often constructed of subpixels, ordinarily a red, a green and a blue colored subpixel, taken together to form a full-color pixel in order to control the perception of color from each pixel by the human visual system.

Each controllable subpixel is located at the intersection of two conductive signal lines, ordinarily referred to as a row and a column line. For example, an array of 3,840 pixels horizontally and 2,160 pixels vertically might be addressed by 11,520 column lines (one for each of the three subpixels comprising a pixel) and 2,160 row lines. In some sub-pixel designs, including In-plane Switching-mode (IPS-mode). In IPS-mode LCDs, a reference voltage, ordinarily called the common voltage or Vcom is provided via conductive traces running parallel to the row or column lines for example. In other cases, the reference voltage is provided on the opposing substrate and in some cases, reference voltages are provided on both the opposing substrate and on conductive traces running parallel to the row and-or column lines.

To control the individual subpixels, electrical signals are created and delivered over the conductive row and column lines. The source of these electrical signals are electronic circuits, called line drivers, that are ordinarily located along edges of the pixel array to minimize the distance the driver is from the row and column lines while remaining out of the active area of the display. Column lines are driven by circuits ordinarily called column drivers that are located along one or both of the horizontal edges of the array. Likewise, row lines are driven by electronic circuits called row drivers located along one or both vertical edges. The row and column drivers are attached electro-mechanically to the row and column lines at specifically designed sites along the edge of the array. These sites accommodate attachment of either one of two means to drive the row or column lines.

A first conventional technique is to attach a custom flexible substrate ordinarily having a single integrated circuit (IC) attached. This assembly of an IC on a flexible (flex) substrate with patterned wires is called a Tape Carrier Package (TCP). The TCP is conventionally applied in an automated process called Tape Automated Bonding or TAB. The TCP is electro-mechanically attached to the row and columns lines at specifically designated sites along the edge of the array.

A second conventional technique is to attach a driving IC directly to the site of the rows and column lines along the edge of the array. This arrangement is called Chip on Glass (COG). It is also a conventional alternative to integrate the driver function directly into the periphery of the active area making use of patterned transistor processing during the fabrication of the display.

FIG. 1 illustrates a conventional custom display with integrated attachment sites. Specifically, FIG. 1 shows display panel 102 having pixel layout 104. Display panel 102 includes TFT substrate 106, external connection contact leads 108, column line fan in 110, COG row driver 110 (with a COG IC die mounting) and row line fan in 114. The display panel 102 may also include attached circuit boards (not shown).

In pixel array 102, together with the row and column line driver attachment sites, or the integrated drivers, or partially integrated drivers or some combination of these form the essential design of the LCD panel as a unit. This unit, created by patterns in layers of materials, is specifically designed to enable the creation of a display having a particular size and a particular pixel format ordinarily expressed as the number pixels wide by the number of pixel high. To manufacture such unit, the design is repeated a number of times on a mother glass, a standardized host substrate for a repeated design unit that is processed by the LCD fabricating process in a standardized way. If another horizontal by vertical size display is desired for example, another design must be made, tooled and then manufactured.

FIG. 2 illustrates a conventional standardized mother glass which hosts several copies of the same custom display design to improve production efficiency. Mother glass 200 serves as the means to design the factory equipment around a standard-sized substrate (mother glass) for efficiency reasons. In FIG. 2, mother glass 200 includes portions 202, 204, 206, 208, 210 and 212. An exemplary mother glass may include a TFT substrate (not shown) and a color filter substrate (not shown). A liquid crystal (LC) medium (not shown) may be interposed between the TFT substrate (not shown) and the color filter substrate (not shown).

Each piece of production equipment is designed to handle the mother glass 200 irrespective of the particular design being made. Therefore, a single design (e.g., 202, 204, 206, 208, 210 and 212) is repeated as many times as needed to fill up the mother glass to minimize the unused space and thereby make as many displays with the same steps as practical. The use of the mother glass to make many copies of the same design further emphasizes the conventional method for making a display: a dedicated, comprehensive design which includes the creation of the electrical connection sites as part of each display.

Other pixel array technologies exist as well. OLEDs for example, share many common elements with LCDs including, in particular, a similar row and column addressing scheme of the subpixels. OLEDs differ from LCDs in that other reference voltage functions, such as power and ground (modulated or not) and in some instances, dimming control signals are also required. OLEDs differ most fundamentally from LCDs in that OLEDs are a self-luminous technology. The array is ordinarily opaque and therefore electronics can be hidden behind the array. LCDs by contrast, are ordinarily operated as pixel-modulated, optical transmission devices making images by locally modulating the transmission of light through them. This light ordinarily originates from a back-light unit behind (the non-viewing side) of the display. Thus, in this ordinary case, it is not possible to place electronics behind the LCD as they would block light from the back-light and not be hidden from view.

SUMMARY

In certain embodiments, the disclosure provides method, system and apparatus to form custom-sized displays from pre-made sheets of uncommitted pixels, sheets of pixels. In certain embodiments, the terms uncommitted pixel refers to general-purpose pixels not part of a specific design. Alternatively, pixels can be harvested from dedicated displays, but re-purposed for a new display size. While the disclosed embodiments reference liquid crystal displays, it should be noted that the disclosed principles are not limited thereto and may be applied equally to forming custom-sized displays from other pixel-based display panels.

In one exemplary implementation, a region of pixels is separated from a larger region or a sheet of pixels, which serves as a stock source for forming custom-sized displays. Edges of this excised region are prepared for electrical signal contact attachment sites to enable electrical connection between the driver and the appropriate row and/or column conductors. In one embodiment, an electro-mechanical connection is constructed at the periphery of the excised pixel region, to the row, column, common electrodes or other electrodes necessary to operate the pixels. The newly-formed connection can provide stimulation of the control lines to operate the excised region as they would have been prior to excision. The ability to properly control an excised region of pixels to allow creation of an image by those excised pixels through the connection of control signals after excising, enables the construction of many differently-sized displays from a thereby, general-purpose, sheet of pixels.

While the disclosed embodiments are illustrated in relation to LCD devices, the disclosed principles are not limited thereto and may be applied to other display technologies. By way of example, extracted pixels of an OLED device can be enabled using a similar approach as disclosed herein; that is, by providing the appropriate stimulus inputs needed to operate the array through attachment of electronics to existing signal lines. The signal lines may be found, for example, at the array periphery.

BRIEF DESCRIPTION OF THE DRAWINGS

These and other embodiments of the disclosure will be discussed with reference to the following exemplary and non-limiting illustrations, in which like elements are numbered similarly, and where:

FIG. 5A is a microscope image showing a portion of pixel traceline after the color filter layer is removed;

FIG. 5B is a microscope image showing the pixel tracelines of FIG. 5A after plasma etching exposes the tracelines;

DETAILED DESCRIPTION

There are applications for custom-sized LCDs that require small production volumes. It is impractical to serve this demand with a conventional, custom-designed LCD. By its nature, a custom-sized LCD is only reasonably available and affordable if large numbers of identical copies are produced. The mass production provides economies of scale which break even when amortized over a large production. Conventional methods fail to produce economical small or custom-sized displays in small quantities.

In one embodiment, the disclosure provides a method to construct a custom-sized display by extracting a region of pixels from a larger region, properly sealing the edges and preparing at least one part of the extracted region to accept attachment of electronic circuitry needed to operate the extracted (and now isolated) pixels or sub-pixels. Conventional display pixel arrays include signal lines for addressing row and column, as well as other control lines such as a common electrode. The signal lines are repeated for each unit. The repeating unit is often a subpixel but may consist of several subpixels or pixels. Regardless of the specific implementation, the ordinary intent of an array of pixels is that every group of pixels be capable of rendering identically to a like group of other pixels in the array so that a portion of an image looks consistent regardless of where that portion is located on the display.

To provide custom-sized display panels from a mother glass panel, an embodiment of the disclosure may include the steps of cutting the mother glass to a desired size while providing access to pixel trace lines of the TFT substrate, exposing the pixel trace lines, preventing lateral shorting in the trace lines as needed and wire-bonding a driver circuitry to the exposed trace lines.

Figure 3:
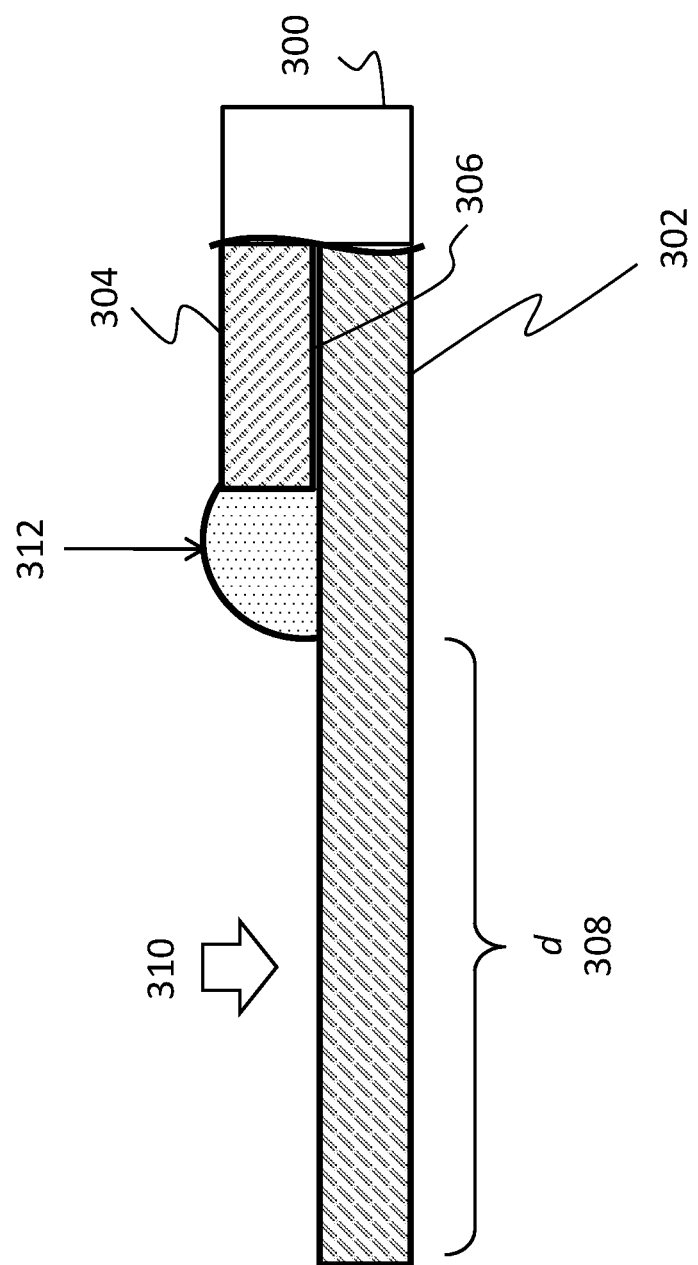
FIG. 3 illustrates a cross-section of a prepared edge representative of an embodiment of the disclosure.

FIG. 3 illustrates a cross-section of a prepared edge representative of an embodiment of the disclosure. Specifically, FIG. 3 shows pixel sheet 300 which includes TFT substrate 302, color filter substrate 304 and LC material 306. TFT substrate 302 may comprise one or more trace lines (not shown) connecting one or more pixels (not shown) thereon. TFT substrate may comprise conventional material used for forming an electronic display panel. Color filter layer 304 may also comprise conventional material (e.g., transparent material). Color filter substrate may provide different transparencies and optical filtration to delineate Red-Green-Blue (RGB) colors. Liquid crystal (LC) material 306 may comprise conventional LC medium used in LC displays.

Figure 2:
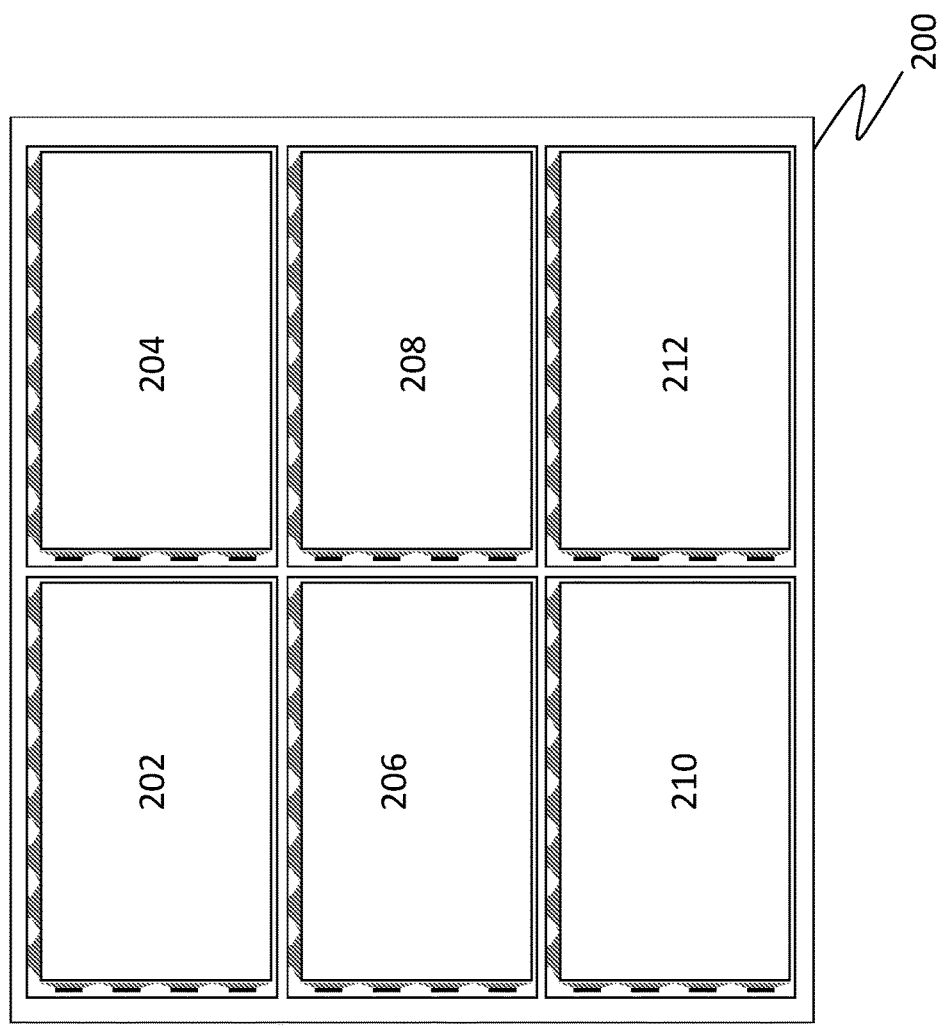
FIG. 2 illustrates a conventional standardized mother glass which hosts several copies of the same custom display design to improve production efficiency.

As discussed in reference to FIG. 2, a large display panel or even an entire mother glass comprised only of pixels, a sheet of pixels, may be cut according to the disclosed embodiments to smaller, custom-sized displays. In FIG. 3, a sheet of pixels is cut such that TFT substrate 302 extends beyond color filter substrate 304 by length d, 308. Length d may be configured such that tracelines connecting pixels (or at least one pixel) to row lines and column lines are accessible as shown by arrow 310. In an exemplary application, the length d may be about 0.5-3 mm. In another embodiment, the length d may be about 1-2 mm. In still another embodiment, length d may be about 1.5 mm. As stated, in one embodiment, the color filter substrate 304 is cut shorter than the TFT substrate 302 to allow access to the pixel array control-signal busses. A flexible (flex) substrate (not shown) with patterned conductors is mated to conductive signal traces on the TFT substrate to effectively extend the control wires on the display. The wire extensions on the flex which can then be routed as needed to circuitry needed to operate the display.

To seal the edge of the now-cut display, liquid crystal sealing material 312 can be used to at least prevent leakage of LC material from the open edge, but also to maintain the spacing between the two substrates, prevent contamination of the remaining LC material, as well as maintaining the mechanical integrity of the assembly. Exemplary sealing material may include UV curable adhesives such as LOC-TITE AA 3492.

A feature resulting from this embodiment is that any extracted region of pixels from a larger region of pixels behaves the same as any other region of the larger region when presented the same control stimulus. It is therefore possible to make many same- or differently-sized custom displays from a single sheet of pixels provided a proper signaling is provided to the array control lines to control each pixel.

Figure 4:
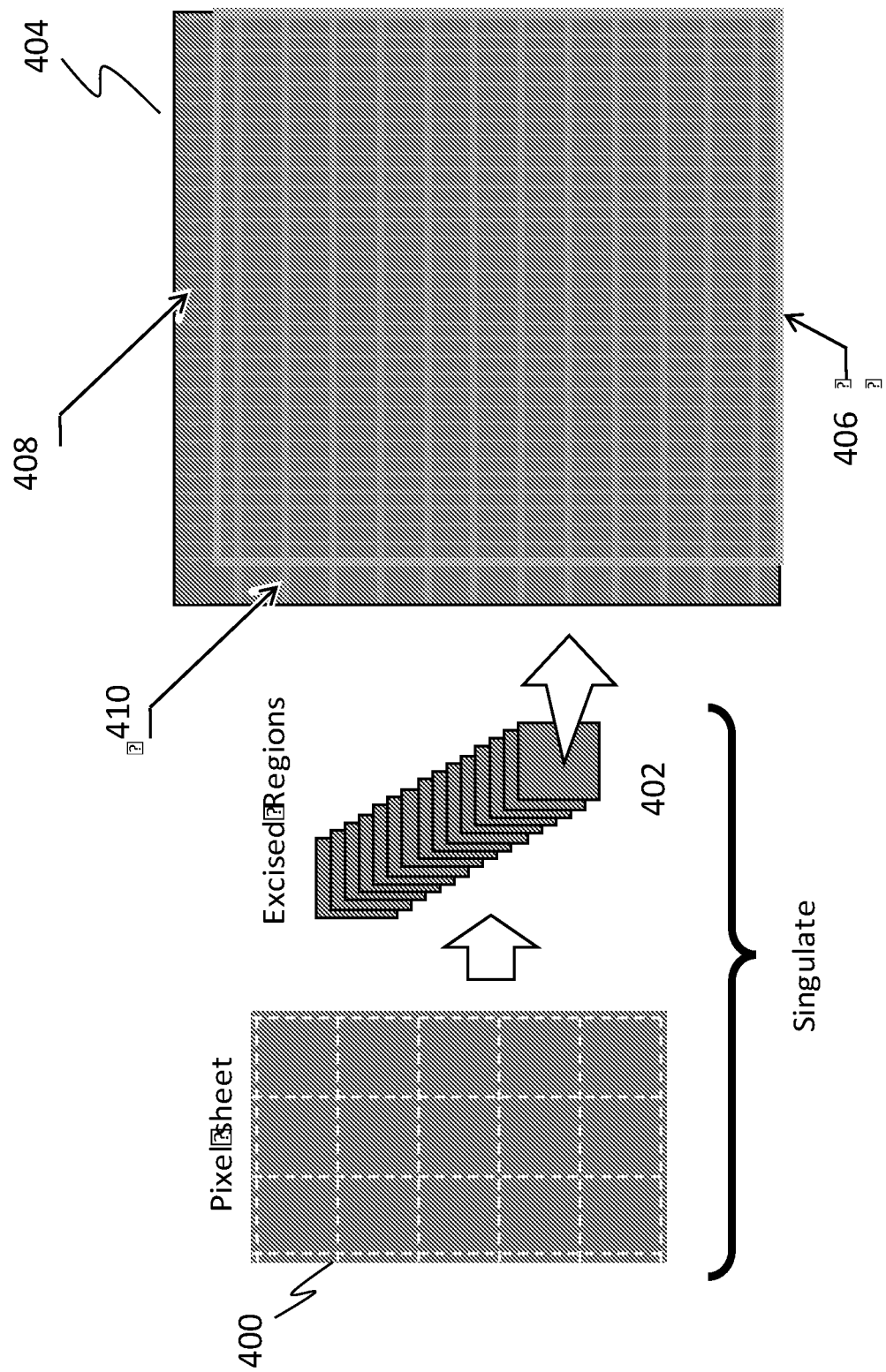
FIG. 4 is a schematic illustration of elements of this invention where a sheet of pixels is sub-divided into smaller regions.

FIG. 4 is a schematic illustration of elements of this invention where a sheet of pixels is sub-divided (singulated) into smaller regions. Each region is then enabled as a display through preparing the edges to accept attachment to electrical conductors which provide pixel address and control lines. In FIG. 4, pixel sheet 400 is subdivided into several excised regions 402. Excised region 404 is a mock-up of a single subdivided display panel. As illustrated, excised region 404 includes a LC seal 406 along the perimeters to prevent LC leakage other benefits. Next, column- and row-line flex-print attachment area is prepared for connection to respective drivers. This is shown as arrows 408 and 410 for column-line and row-line flex, respectively.

Figure 1:
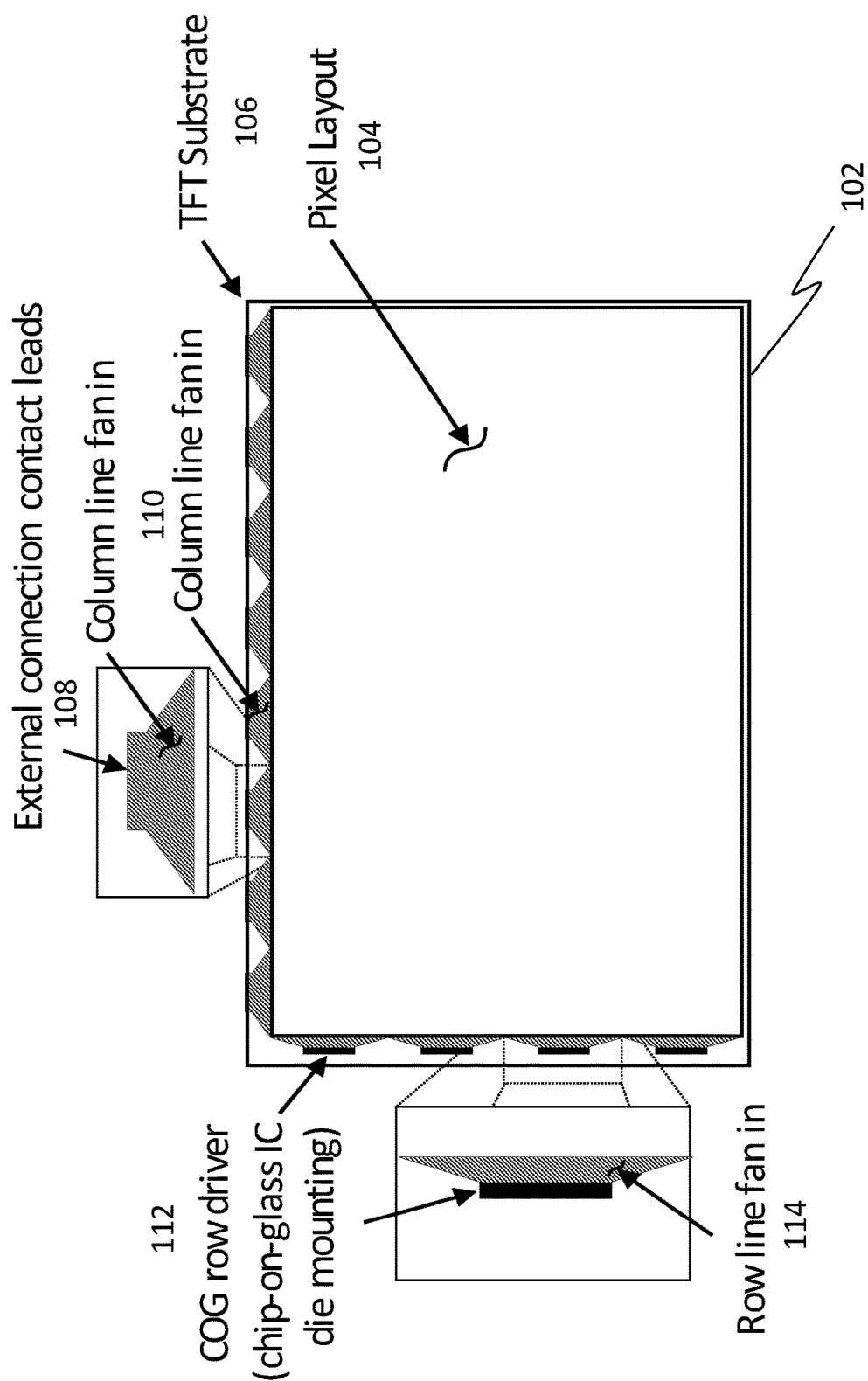
FIG. 1 schematically illustrates a conventional custom display with integrated attachment sites.

In an exemplary embodiment, the column and row lines which have been made accessible after cutting a larger panel (see FIG. 1) are exposed (made conductive) by removing the passivation layer, if needed. The passivation layer may be, for example, silicon dioxide (SiO2).

FIGS. 5A and 5B show a representative subpixel together with a portion of pixel traces after cutting a sheet of pixels (FIG. 5A) and after plasma etch to render conductive (exposed) control line traces. In FIG. 5A, the color filter layer is removed and the TFT substrate is exposed. FIG. 5A shows column lines 502, row lines 504 and common voltage line 506. Each group of column line and row line control a group of pixels. Upon removal of the color filter layer (FIG. 4), each of the tracelines may be accessible.

However, the tracelines may be covered by a passivation layer thereby making them not electrically accessible. In one embodiment of the disclosure, the tracelines are made conductively accessible by removing the passivation (or dielectric) layer from the tracelines. This is shown in FIG. 5B, where plasma etch is used to remove the passivation layer to leave exposed traces 510 intact. The exposed tracelines may now be accessed by a new driver circuitry. That is, the uninsulated tracelines can now be electrically contacted by any of a number of suitable ohmic-contact means, including for example, wire bonding, to thereby provide a conductive path to apply the required control signals from external sources to drive the row lines, column lines and any other control lines to direct the pixels of the newly formed, now display panel element, the display region. On one embodiment of the disclosure, plasma etch is used to remove the passivation layer covering the tracelines. A plasma etch process, for example, can etch away the overcoat while having a negligible impact on the underlying metal leads which form the address and control lines. Other physical and/or chemical processes may be used without departing from the disclosed embodiments.

Once the tracelines are conductively exposed, a laser or other means can be used to remove material from between parallel address and control lines to prevent an unintended conduction path (i.e., shorting) between the parallel traces on the TFT substrate. Shorting could occur if, for example, in the case of wire bonding, the weld of the wire contact points are wide enough to contact both horizontal and vertical going traces simultaneously. This removal step may be optionally performed before or after the insulation layer removal step and may be eliminated if lateral conduction between parallel lines is not an issue. In an exemplary embodiment, laser ablation may be used to strategically remove a portion of the conduction path to prevent shorting.

Figure 6:
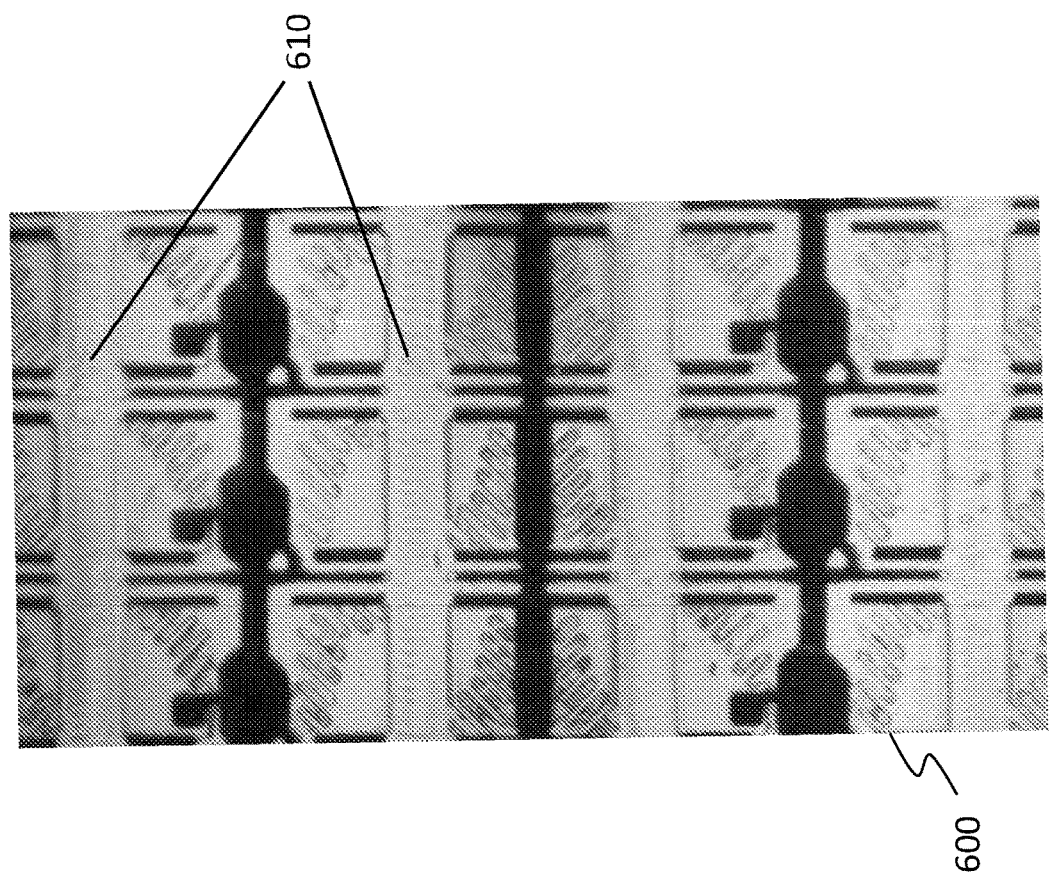
FIG. 6 is a microscope image showing optimal removal locations of tracelines to prevent shorting.

FIG. 6 is a microscope image showing optimal removal locations of tracelines to prevent shorting. In FIG. 6, horizontal and vertical tracelines are shown on a portion of TFT substrate 600. Locations 610 show exemplary location for laser ablation. Removal of a portion of the tracelines at locations 610 can prevent signal shorting.

Figure 7:
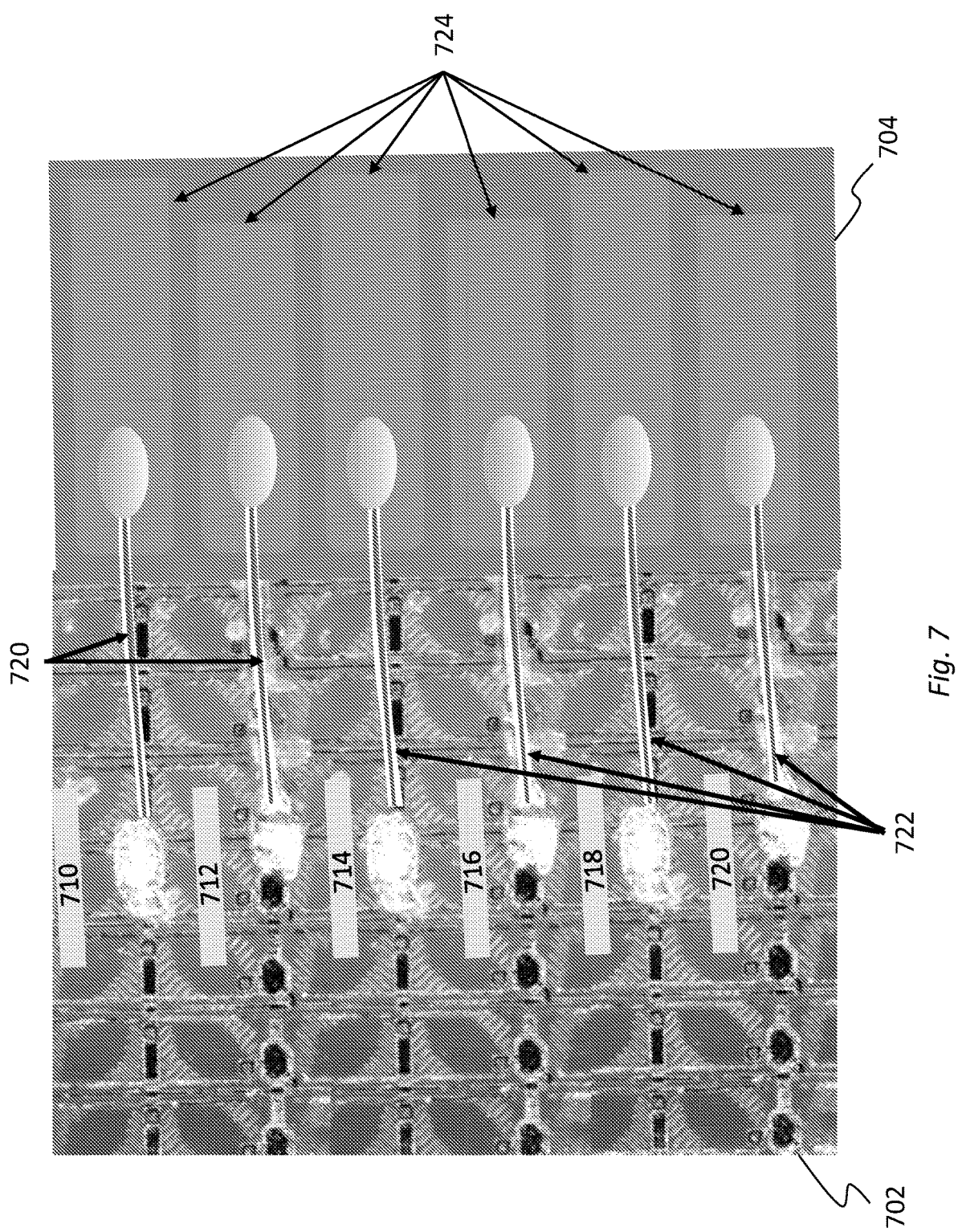
FIG. 7 is a microscope illustration showing wire-bond connection between the edge of the TFT substrate and a driver circuit flex according to one embodiment of the disclosure.

FIG. 7 is a microscopic illustration showing, by way of example, wire-bond connection between the row-edge of the TFT substrate and a driver circuit flexible printed-wire substrate according to one embodiment of the disclosure. Specifically, portion 702 shows an edge of a TFT substrate of a region of pixels exposing row and common electrode edges, a row-side edge. Portion 704 illustrates an edge region of a printed-wire substrate, for example, with conductive traces 724 matching the pitch of the signal line traces being connected. In this row and common voltage connection example, wires 722 make a wire bond contact to both row and common voltage traces of the TFT substrate and the corresponding trace 724 of the substrate 704. Traces 724 lead away from the edge of the TFT substrate to the line driving circuit (not shown) and thereby there is a conductive path from each individual line driver signal source to each individual row and common voltage trace of the TFT. The exposed tracelines define the column and row lines as well as the common voltage line in this example display. In this row and common voltage connection example, the row and common electrodes are connected to corresponding traces on substrate 704 and column lines are not connected. It will be understood that in another example, column lines, along a column-edge might be connected to traces on a substrate in like fashion, where row and common line traces of the TFT substrate are not connected. In yet a third example, in which a TFT cut edge is substantially along a diagonal, at least locally, where row traces, common voltage traces and column lines intersect the TFT edge, connection to all three types of traces might be made in light fashion between drive signal sources and corresponding TFT control signal traces. In FIG. 7, the vertical lines define conductive column lines. Laser ablation is used, in this example of contacting row and Vcom lines, to remove conductivity (shorting) through the column lines. Portions 710, 712, 714, 716, 718 and 720 define portions removed by laser ablation to prevent shorting. Several wire-bonds 722 connect pertinent tracelines 724 of substrate 704. Each wirebond wire 722 connects one of the TFT tracelines to a respective electrical trace of the driver circuit signal traces 724 of substrate 704.

Figure 8:
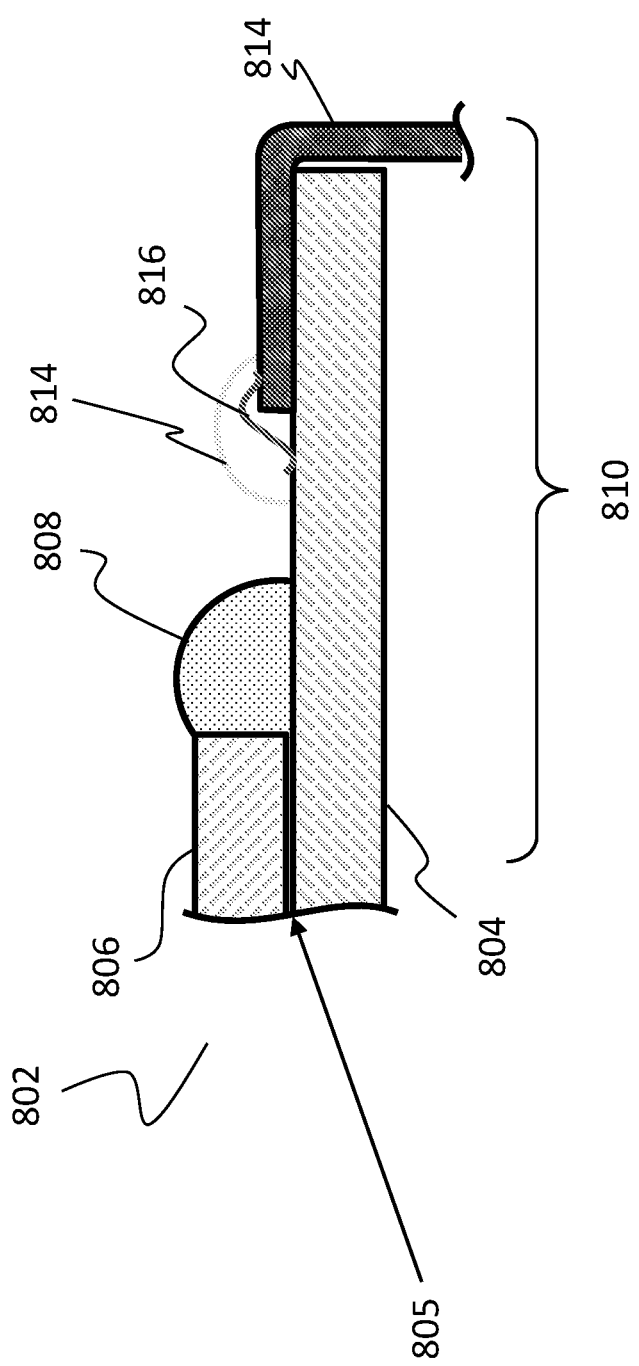
FIG. 8 schematically shows a cut glass edge cross section according to one embodiment of the disclosure.

FIG. 8 schematically shows a cut glass edge cross section according to one embodiment of the disclosure. In FIG. 8, pixel sheet 802 has been cut according to the disclosed principles. Substrate 802 includes color filter substrate 806 and TFT substrate 804. A liquid crystal 805 medium is disbursed between substrates 804 and 806. Liquid crystal is sealed as schematically shown at location 808. Tracelines (not shown) of the TFT substrate are connected to driver bus 814 through wirebond 812. The location of wirebond 812 is then optionally sealed as shown by encapsulant 816, as required, for example LOCTITE AA 3492® (from Henkel Adhesives Technologist), a silicon-based RTV adhesive or other suitable means. In FIG. 8, the cut portion of the display can be minimized to provide a minimal bezel area 810 and thereby a maximum active area out of the total area of the display unit surface facing the viewer.

Figure 9:
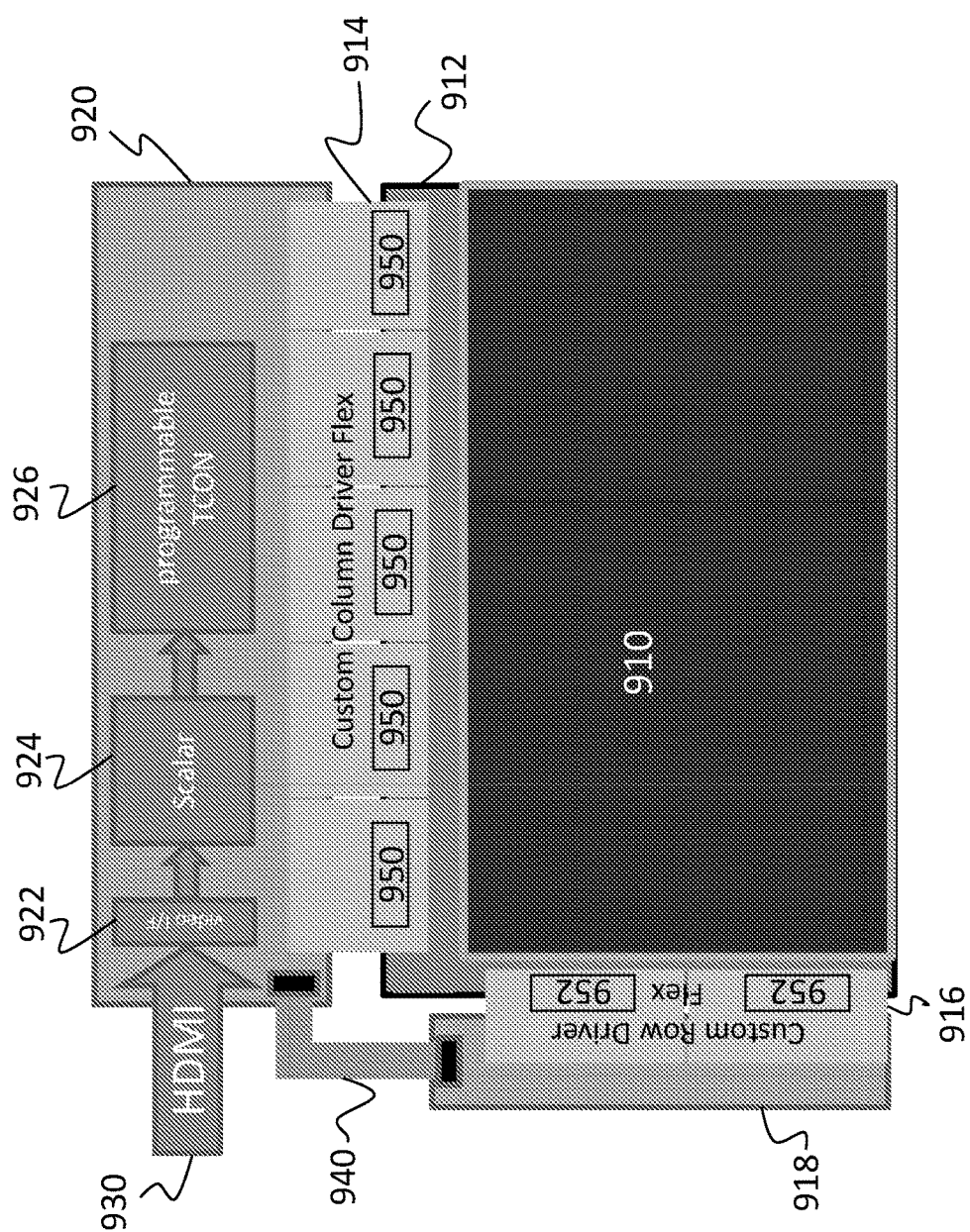
FIG. 9 schematically illustrates a custom display panel formed from a larger sheet of pixels according to one embodiment of the disclosure.

FIG. 9 schematically illustrates a custom display panel formed from a larger sheet of uncommitted pixels, or pixels harvested from a larger display panel according to one embodiment of the disclosure. In FIG. 9, display region 910 is formed from a larger sheet of pixels. Display region 910 comprises a standard pixel pitch as was formed in the originating pixel sheet. A horizontal edge and a vertical edge of display region 910 are cut according to the disclosed principles, such that the TFT substrate extends beyond the color filter (or other) substrates. After exposing the tracelines of the TFT substrate, custom column driver flex 914 and custom row driver flex 916 are attached to the exposed tracelines on the open horizontal (column-edge) and vertical (row-edge) sides. In this exemplary embodiment of the invention, the column driver flex 914 connects the column tracelines to column driver integrated circuit 950 mounted on the flex 914 and the column driver 950 to the column driver printed circuit board 920. Flex 914 may also connect other control signals, such as the common voltage for example, to the circuit board 920. Likewise, the row driver flex 916 connects the row tracelines to row driver integrated circuit 952 and the row driver to the printed circuit board 918. Flex 916 may also connect other control signals such as the common voltage for example, to the circuit board 918. Row driver circuitry board 918 and column driver circuitry board 920 communicate through connection bus 940.

Column driver circuitry may include video interface integrated circuit 922 to receive for example, HDMI signal 930. Video interface circuitry 922 demultiplexes the incoming signal, which may be an HDMI signal or other video signal stream. The demultiplexed signal is then communicated to optional scalar circuitry 924. Optional scalar circuitry 924 may be designed to control the size of the image rendered by the display region 910 by receiving the incoming video signal image and making it larger or smaller as needed to assure the rendered image occupies the intended area of the display region 910. Timing controller (TCON) 926 provides and synchronizes the row and column signal timing.

One consequence of making differently-sized displays from a same pixel array is that the number of pixels per unit area will remain the same but the area will change. If for example, a custom-display designer wants to make a conventional 1024 horizontal×768 vertical pixel array to have a 10.4-inch diagonal image size, the designer would layout the display to have those exact parameters. However, in one application of the disclosure, the size of the display can be made suitably close to 10.4-inch diagonal, but may have 2000 horizontal.times.1500 vertical pixels for example. An image source which is captured natively as 1024×768 pixels will not fill up the whole image area. If an electronic image scaler is provided upstream of the 2000×1500 display, the 1024×768 image can be enlarged or scaled to 2000×1500 pixels and thereby occupy the whole active area of the custom-sized display.

In the display made according to an embodiment of the disclosure, the image may be rendered with more pixels than the conventionally-designed, custom-sized display can render. This higher resolution rendering of the original 1024.times.768 native format image, for example, is only subtlety different from as it would appear on the conventionally-designed, custom-sized display and for most application intents and purposes is equivalent. Thus, a part of the design to allow a standardized pixel array stock to be used to construct a custom-sized display is the use of a scaler to emulate the image pixel count format of the custom-sized display region 910.

A scaler is a conventional electronic circuit that is used to convert one image pixel format to another. An image is ordinarily rectangular and describable as x pixels wide and y pixels high. A rectangular display that is xx pixels wide and yy pixels high will only be to render the x by y image while using the whole of the display and while displaying all the image when x=xx and y=yy. However, the two pixel formats are not the same in general. The image can have both pixels than the display. There are standardized formats for both images and displays. In this case, the pixel format (xx by yy) of the constructed custom-sized display made from the extracted region of pixels is known. A scaler can be employed to accept one or multiple standard input formats (e.g., 1024×768, 1920×1080, 3840×2160, etc.) so that the resulting custom-sized display system can be thereby designed to render any particular input format on the constructed, custom-sized display having a fixed pitch of pixels that may or may not correspond to the incoming image. This feature separates display pixel pitch from display size. As a custom-sized display of the present disclosure is constructed from a sheet of pixels having a fixed pitch, the scaler function assures that a standard video input format for example can be rendered on the custom-sized display at full size (i.e., where the rendered image is neither cropped nor rendered in only a portion of the display area). FIG. 6 shows representative flow diagram of electronic circuit blocks used to receive video signals of an image control the extracted pixel region to render the image.

Figure 11:
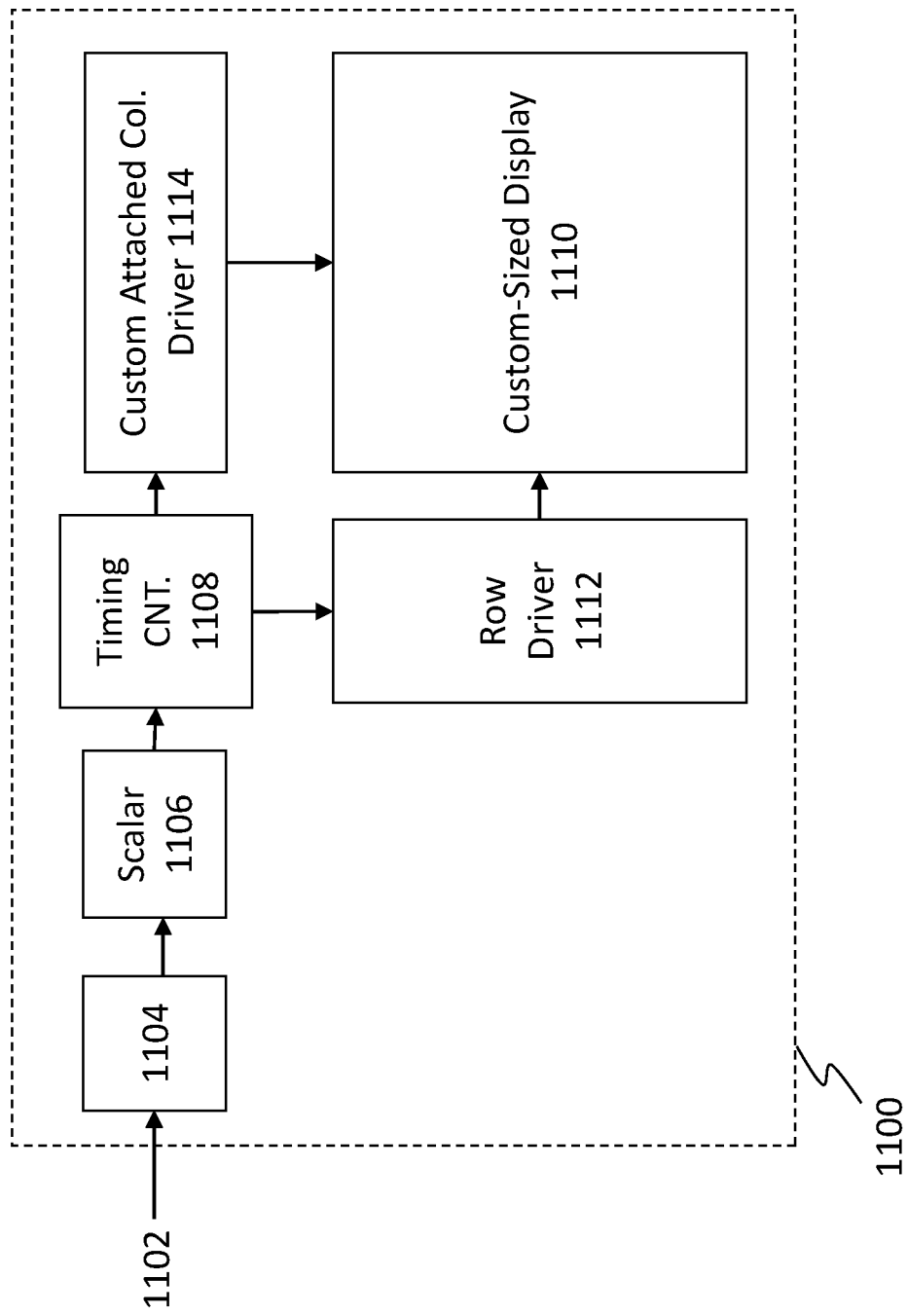
FIG. 11 schematically illustrates the column driver circuit board of in FIG. 9.

FIG. 11 schematically illustrates the column driver circuit board 920 of in FIG. 9. Specifically, FIG. 11 provides an exemplary functional block diagram of electronic circuit blocks used to receive video signals and provide an image control to the extracted pixel region of the display. Each representative box in FIG. 11 may comprise hardware, software, firmware or a combination of hardware, software and firmware. Each representative functional block may include one or more processor circuitries in communication with one or more memory circuitries to provide the desired function.

In FIG. 11, column driver circuitry 1100 receives video source signal 1102. The video source signal may be a generic video signal without consideration of the display size. Video source signal may comprise, for example, LVDS (FPD-Link), eDP, V-by-One, HDMI, VGA, DVI and the like. Signal receiver 1104 receives and optionally demultiplexes the incoming signal. Signal receiver 1104 may optionally demodulate the incoming signal. The received signal is then directed to scalar circuitry 1106. Scalar circuitry 1106 may be optionally used to scale the incoming signal to the proper size for the new display panel having display region 910.

Figure 10:
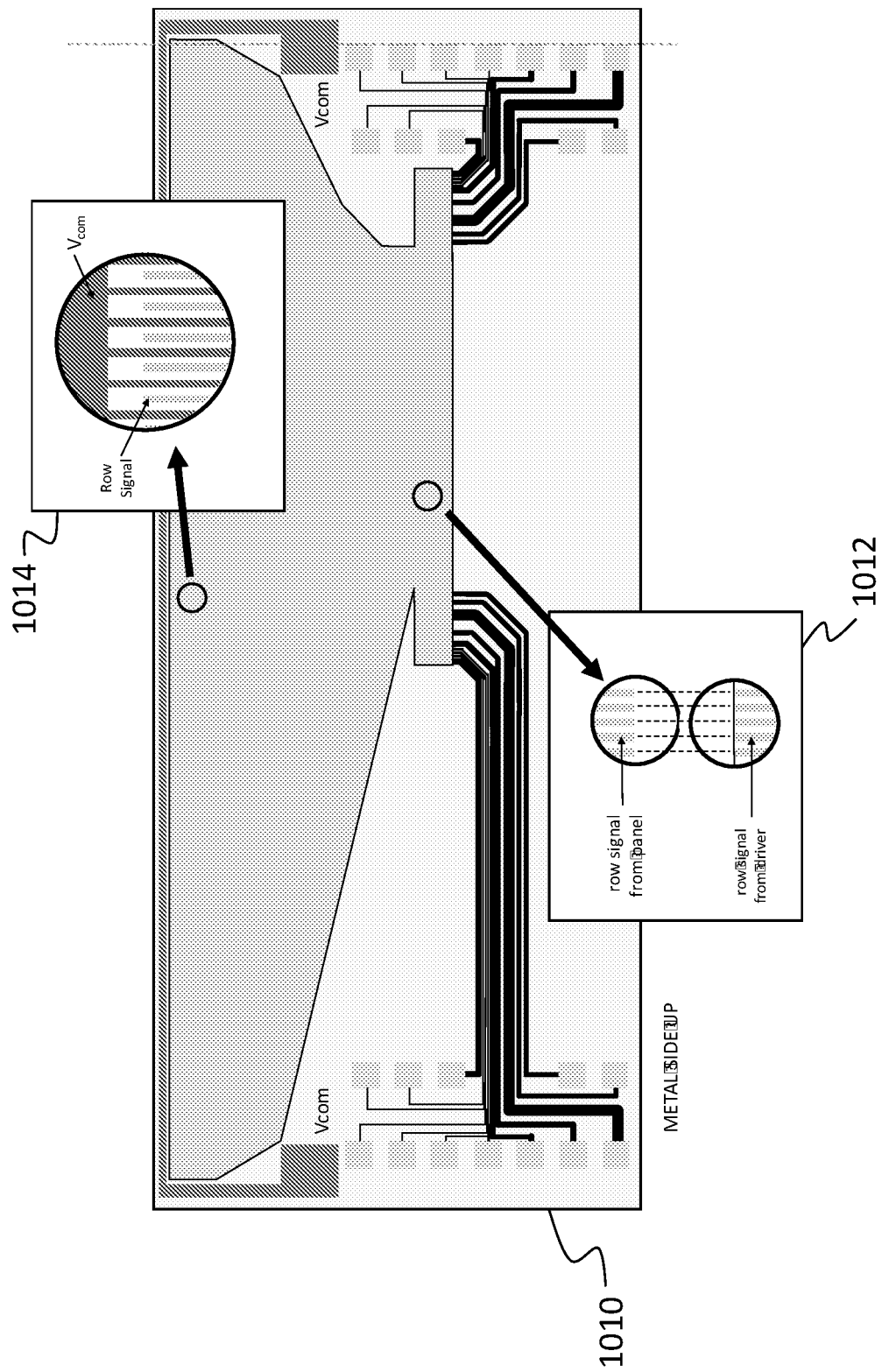
FIG. 10 schematically illustrates custom flex lines according to one embodiment of the disclosure.

Timing controller 1108 communicates with both the custom attached column driver 1114 and custom attached row driver 1112 to provide proper signal timing for each display pixel. The custom attached column and row drivers may be similar to the flex drivers described in relation to FIG. 10. The column and row drivers then communicate the image signal to display 1110, which may be a custom-sized display according to the disclosed principles.

Figure 12:
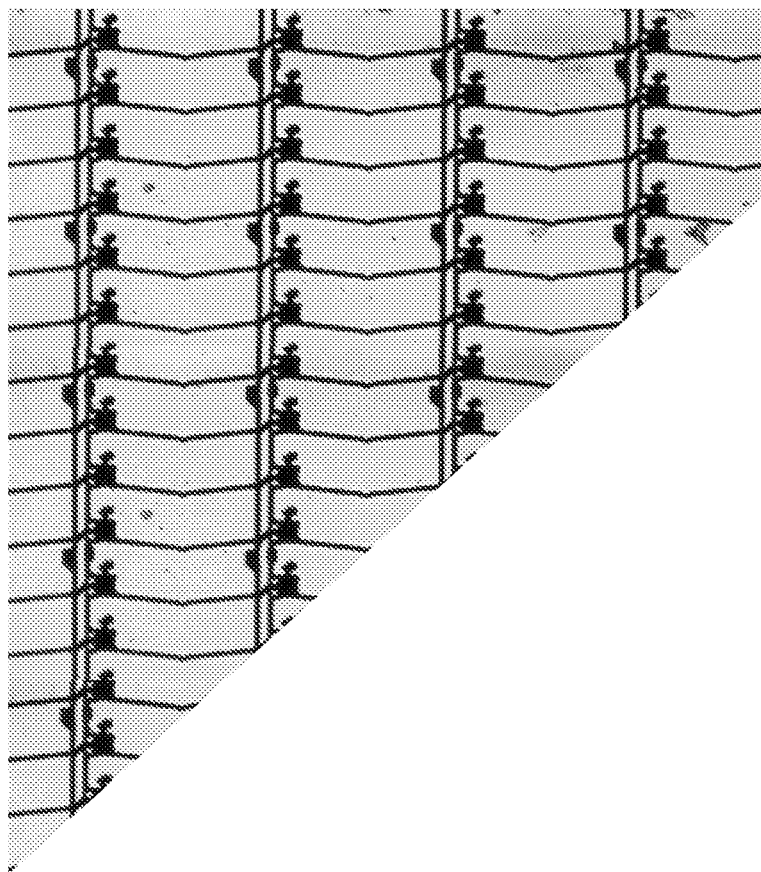
FIG. 12 is a microscope image showing a diagonally-cut pixel region according to one embodiment of the disclosure.

In another embodiment, the disclosure relates to connecting to both address and control lines to displays cut along a diagonal edge relative to the pixel array's row and column organization. Cutting displays along a diagonal enables making virtually any shape as shapes can be approximated with piecewise straight segments along the periphery or alternatively, the TFT edge may be cut along a continuously curving path, to accomplish any shape. In other words, a regular or irregular shape, including for example round, can be approximated by a mix of horizontal, diagonal and vertical segments of varying length. Thus, in certain disclosed embodiments, the edge of a display sheet may be cut diagonally or along a curve. In this manner, pixels are, at least locally, approximately diagonally cut at the TFT substrate. FIG. 12 is a microscope image showing a diagonally-cut pixel region according to one embodiment of the disclosure.

Figure 13:
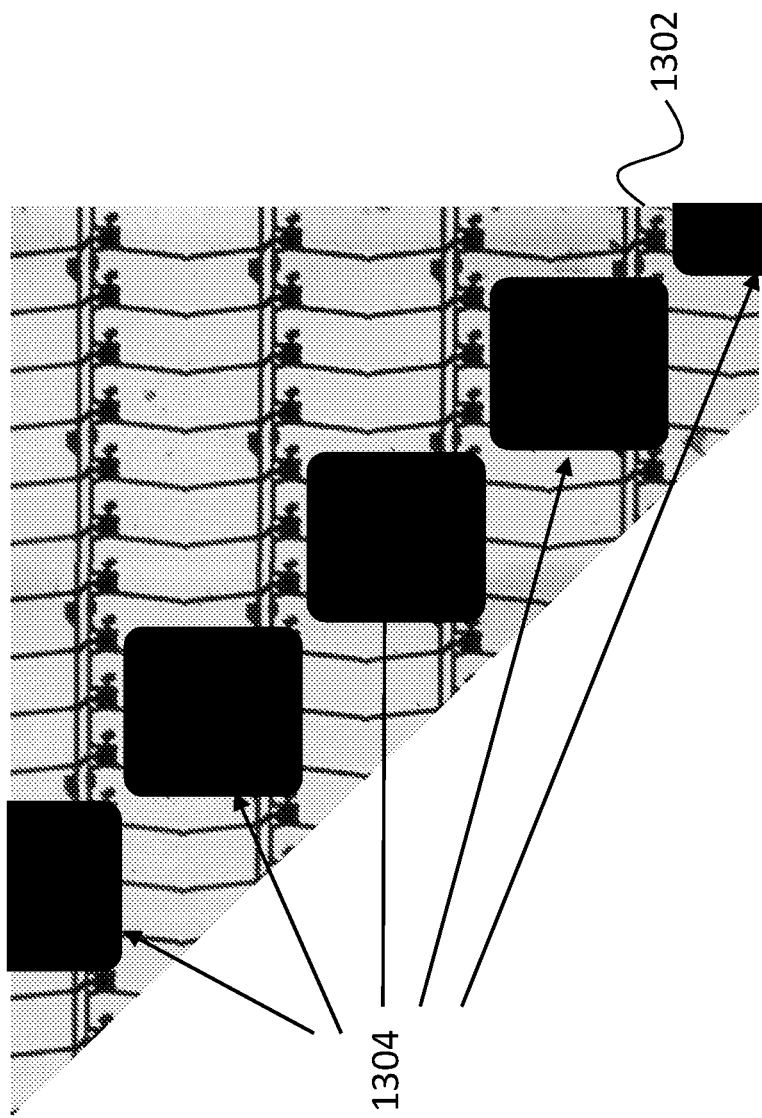
FIG. 13 illustrates conductive metal pads patterned over traces in the pixel array along the diagonal cut of a display.

FIG. 13 illustrates conductive pads patterned over traces in the pixel array along the diagonal cut of a display. Display 1302 of FIG. 13 includes tracelines (row lines, column lines and common voltage line) that control each pixel. In addition, conductive pads 1304 are patterned over traces in the pixel array along the diagonal cut. The addition of conductive material (pad) over the exposed traces increases the surface area of the leads. Such addition may be optional. In one embodiment, conductive pads may be deposited either in a proper pattern or broadly and then post patterned using a laser ablation or other means for isolating the control signal leads.

Figure 14:
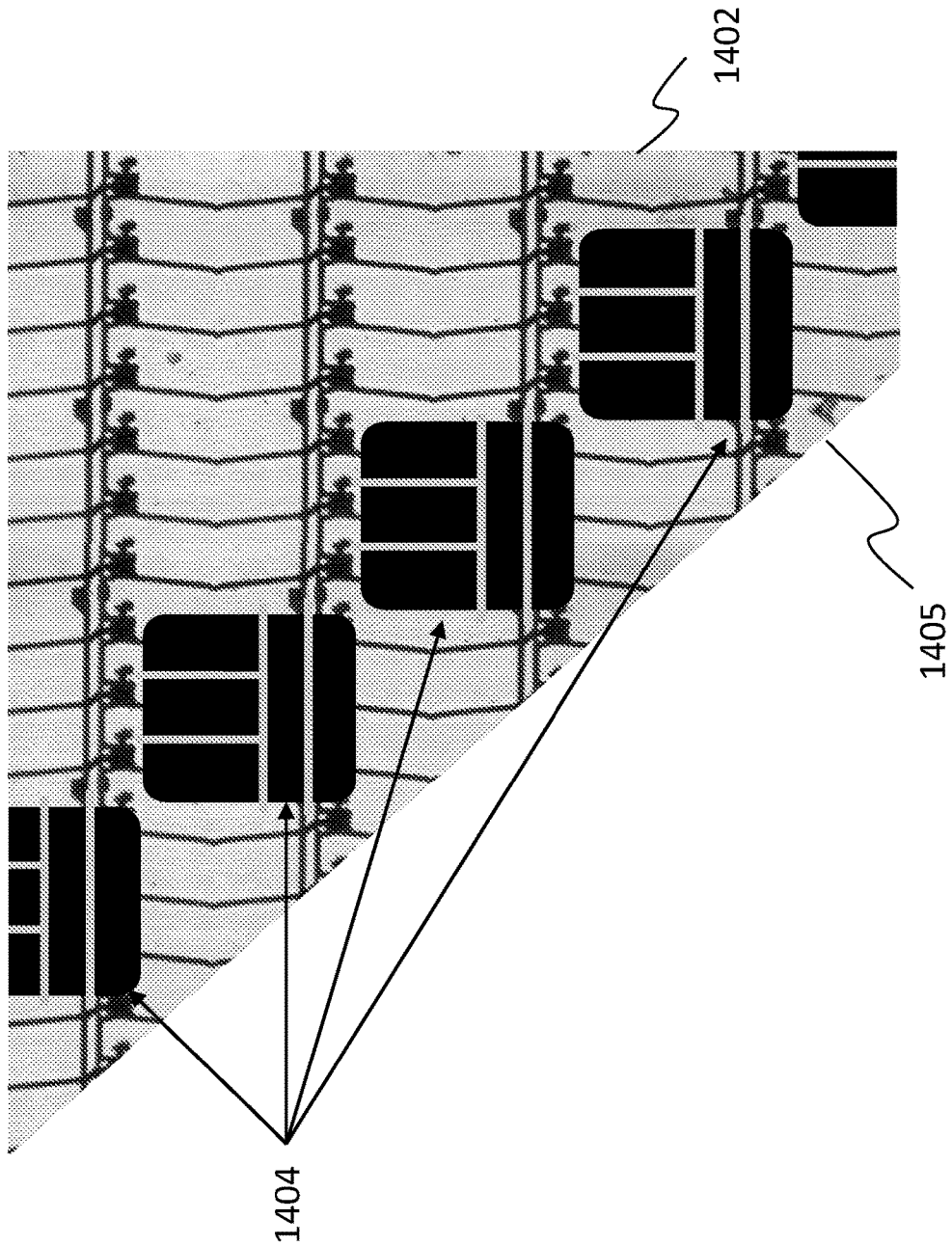
FIG. 14 shows further isolation patterning of the ink pad through, for example, laser ablation according to one embodiment of the disclosure.

FIG. 14 shows further isolation patterning of the pad through, for example, laser ablation according to one embodiment of the disclosure. The additional patterning creates fine features of conductive pads which may be registered to trace the pattern of the TFT substrate. In FIG. 14, the diagonally cut display is custom-designed to have a diagonal geometric shape. It includes main display 1402 with a side-cut portion 1405. At the side-cut portion 1405, conductive pads 1404 are arranged along the side-cut 1405. The conductive pads 1404 can be coupled to a flex pad as will be discussed further below. In one application, a precision laser can be used to ablate away material including material below the ink pad. An ACF (not shown) can be placed as a strip covering all the ink pads.

Figure 15:
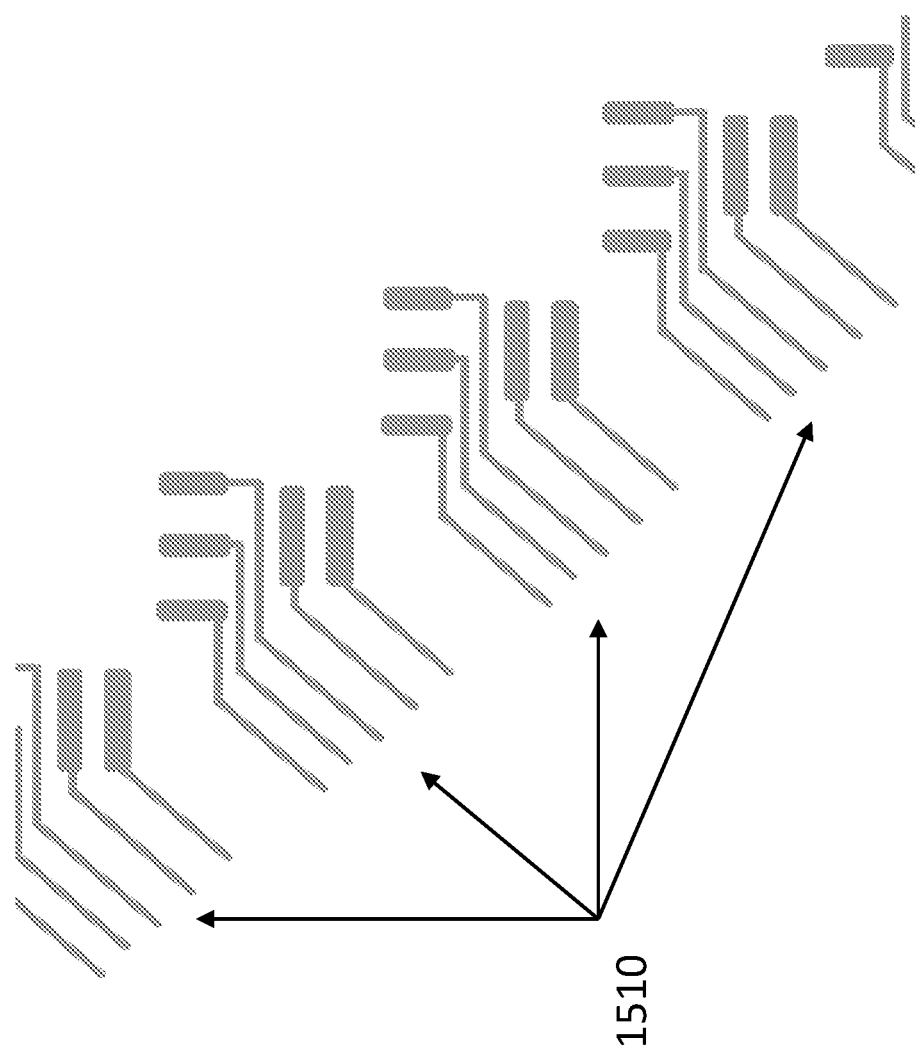
FIG. 15 illustrates a so-called stair stepped flex with conductive traces patterned on the rear side of the flex substrate according to one embodiment of the disclosure.

FIG. 15 shows the conductive traces patterned on the rear side of the flex substrate (not shown) according to one embodiment of the disclosure. The stair stepped flex can be used with diagonal cuts as shown at FIGS. 12-14. In FIG. 15, conductive traces 1510 can be used to couple a driver circuitry (not shown) to the pads on the TFT substrate side-cut or the diagonal edge.

Figure 16:
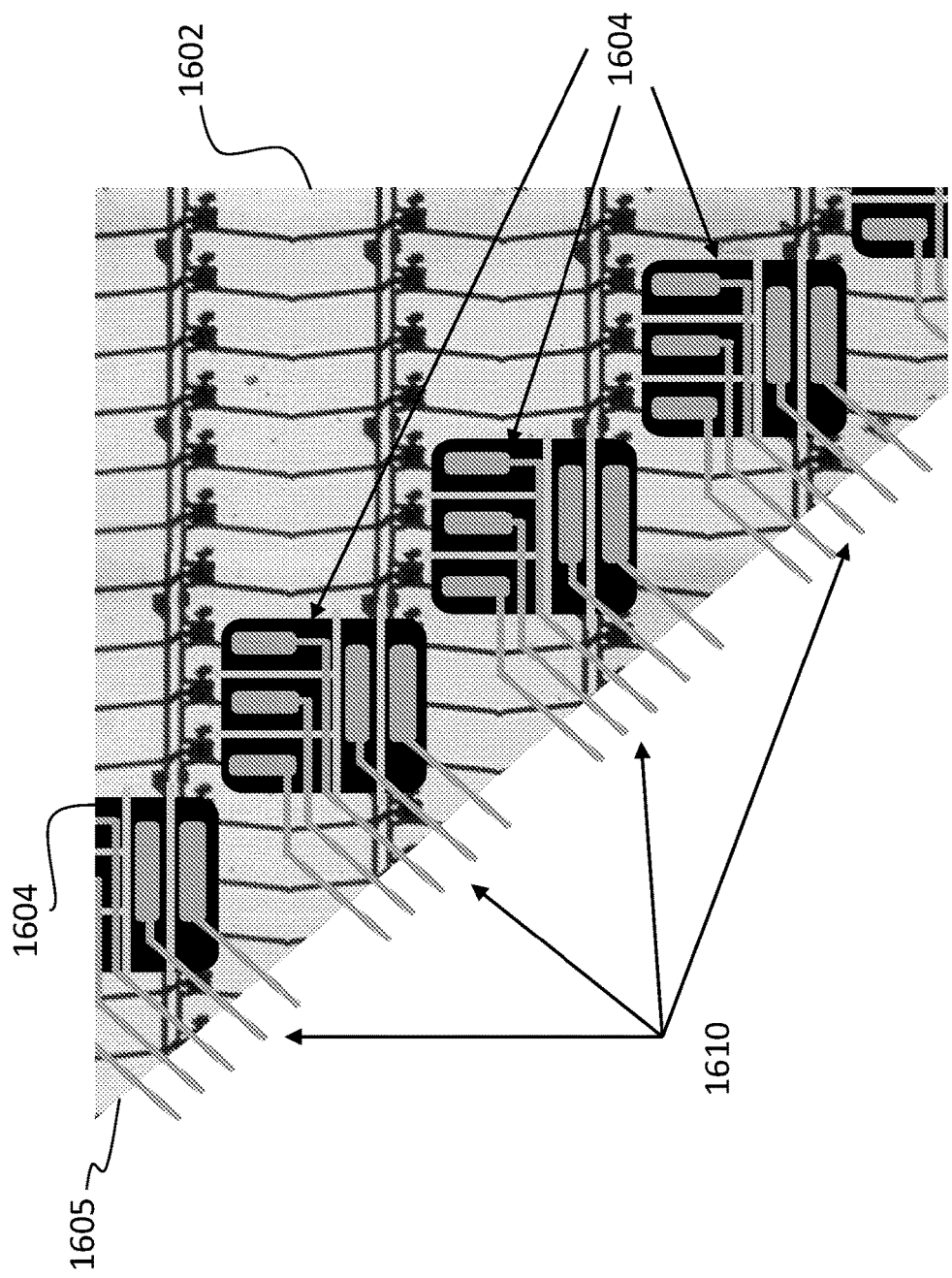
FIG. 16 shows the stair stepped flex with conductive traces of FIG. 15 bonded to the diagonally cut and patterned diagonal cut of display of FIG. 14.

FIG. 16 shows the stair stepped flex with conductive traces of FIG. 15 bonded to the diagonally cut and patterned diagonal cut of display of FIG. 14. As shown in FIG. 16, the flex and prepared TFT substrate aligned and attached to each other through the ACF (not shown) sandwiched between the two substrates. Note that the five electrodes of each large pad are connected to a separate wire on the flex. In FIG. 16, display 1602 is formed with a diagonal side-cut 1605. The traces 1610 are connected (e.g., wire-bonded) to respective patterned pads 1604 to provide signal communication between a driver (not shown) and display 1602.

Figure 17:
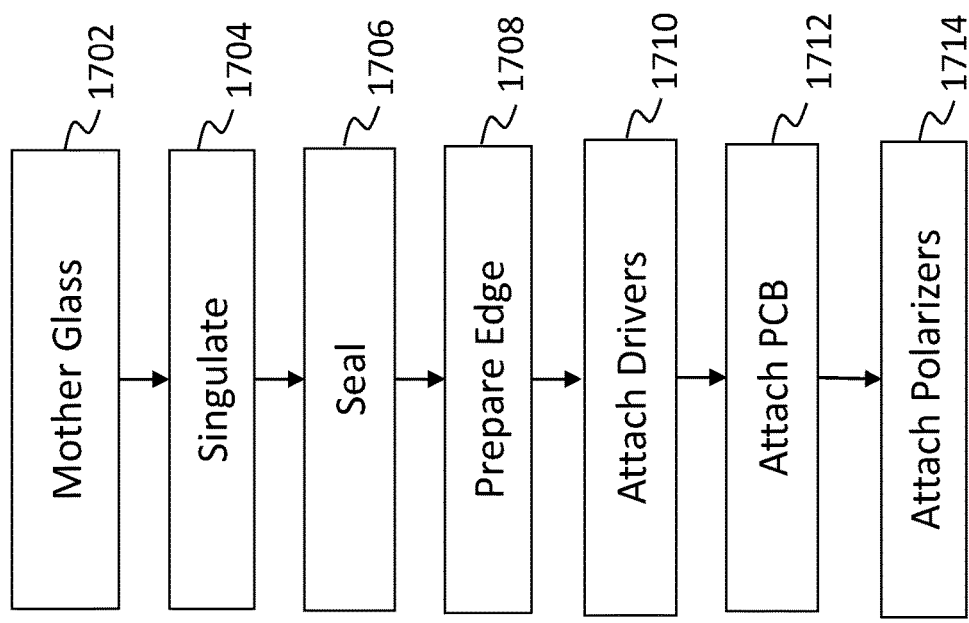
FIG. 17 is a flow diagram for forming a custom-sized display according to one embodiment of the disclosure.

FIG. 17 is a flow diagram for forming a custom-sized display according to one embodiment of the disclosure. The process of FIG. 17 starts with providing a mother glass or a large-scale glass display. The glass display may include conventional substrates and printed circuitry (e.g., TFT circuitry on a substrate) to receive an image signal and display an image. At step 1704, the mother glass is cut to one or more smaller sizes (i.e., singulated). The smaller display regions, formed to become an element of a display panel may be of substantially the same sizes or may have different shapes and sizes, depending on the desired application. At step 1706, the liquid crystal layer is sealed to prevent leakage of the liquid crystal and provide other benefits previously mentioned.

At step 1708, the cut edge(s) are prepared. In one application, the tracelines of the TFT substrate may be etched (chemically, physically, both or otherwise) to expose the tracelines and thereby render them conductive. For example, chemical etching or ion plasma treatment may be used to expose the traces. In another embodiment, laser ablation or other methods can be used to prevent possible shorting between proximal tracelines.

At step 1710, row and column drivers are attached to the panel display's edges. In an exemplary embodiment, custom driver contact points are used to connect a diagonal edge of a display region through flex lines to a driver. At step 1712, a printed circuit board (PCB) or other integrated circuitry (IC) having the driver and optionally other video processing circuitry is connected to the custom-sized display through the flex lines. At step 1714, one or more polarizers may be optionally attached to the exposed tracelines. In one application, the polarizers may be optical sheets that go over the display region and part of the optical light-valve function of an LCD. The polarizers may be optionally added before, after or in the middle of the process.

While both the use of wire bonding and ACF attachment technology are disclosed as a means to connect one conductor to another, it will be understood that such an electrical connection can be made by a number of means without departing from the present invention.

Displays may be custom sized in as much as a design is commissioned to create an image region having a particular area and a particular pixel pitch. A custom display of the instant disclosure is capable of being any size and has several advantages over the conventional approach in which an OEM makes a display with the electronic drive circuitry attachment points are embedded in the pixel design from the onset. One advantage of the present disclosure is reduced construction costs. Commissioning a custom-sized display from an OEM is a massive undertaking requiring a large investment of design engineering time to layout the custom display for production and a large investment in the masks and other custom tools needed to produce the design. Design houses and OEMs charge large sums to cover these costs and also require a large minimum order size. In the instant disclosure, pre-made pixels are used and so none of these costs are incurred for the commissioning of the custom display. Furthermore, the lead time between when the custom design is commissioned and when the first article is available is most often 6 months to a year. In this disclosure, these lead times can be significantly reduced because the design is made from stock, pre-made pixels and so none of the design and factory tooling time is incurred. Further still, OEMs require a large minimum order size to both amortize much of the costs for the design across many units and thereby make an individual display less costly as well as justify the lost-opportunity costs where the same resources could have been devoted to a more profitable display. In the instant disclosure, because the displays are made from pre-made pixels, the large costs of the OEMS and design houses are avoided. Furthermore, because the disclosure avoids all these costs, it is possible to offer much smaller minimum order quantities.

Because of all of these and other advantages there are many applications which can benefit from a custom display made by the disclosure. These applications include, for example: industrial equipment, medical equipment, aircraft displays, automotive displays, home appliances and public information displays among other examples. Furthermore, because of these advantages new applications can be enabled, applications which would otherwise not have adequate volume to justify the minimum order quantity requirements for example. As the display application field is expanding this disclosure provides enablement to support that expansion.

The disclosed principles may be implemented with automated systems, including artificial intelligence and/or automated systems. In one example, a processor circuitry may be programmed with instructions stored in a memory circuitry, which when executed by the processor circuitry causes one or more devices to implement the steps recited in any of the disclosed embodiments. In another embodiment, the disclosed principles may be stored at a non-transitory medium and implemented by one or more processor circuitries to provide a custom display according to the disclosed principles. In still another embodiment, the disclosed embodiments may be implemented in software, hardware or a combination of software and hardware (e.g., firmware) and cause one or more devise to implement the disclosed principles to thereby form a display panel from a sheet of pixels.

The following examples are provided to further illustrate additional non-limiting and exemplary embodiments and/or applications according to the disclosed principles.

Example 1 is directed to a method to form a custom display from a sheet of pixels, the method comprising: providing a sheet of pixels having a TFT substrate, a liquid crystal layer and a second substrate, the sheet of pixels having a first perimeter, the liquid crystal medium interposed between the TFT substrate and the second substrate; forming a display panel from the sheet of pixels, the display panel having a display panel perimeter, the second display having a first edge defined by the TFT substrate extending beyond the second substrate to thereby expose an electrical trace on the TFT substrate; sealing the liquid crystal layer on the first edge; conductively exposing the electrical trace on the TFT substrate; and forming a column driver line on the TFT substrate to communicate a driver signal to the second display.

Example 2 is directed to the method of example 1, further comprising connecting the column driver line on the TFT substrate to an external driver.

Example 3 is directed to the method of any preceding example, wherein connecting the column driver line on the TFT substrate further includes wire-bonding a driver line to the at least one etched electrical trace.

Example 4 is directed to the method of any preceding example, wherein the external driver further comprises a scalar to convert an incoming image signal for the display panel to a second image signal configured to properly scale an image to be displayed on the display panel.

Example 5 is directed to the method of any preceding example, wherein conductively exposing the electrical trace further comprises exposing the electrical trace by substantially removing a passivation layer.

Example 6 is directed to the method of any preceding example, wherein conductively exposing the electrical trace further comprises removing $SiO_2$ from the electrical trace.

Example 7 is directed to the method of any preceding example, wherein the TFT substrate extends beyond the second substrate by about 0.5 to 3 mm.

Example 8 is directed to the method of any preceding example, wherein forming a column driver line on the TFT substrate further comprise laser ablating to define a conductive path on the TFT substrate.

Example 9 is directed to the method of any preceding example, further comprising connecting the conductive path with an external column driver and wherein the column driver is configured to scale a first image signal configured for the display panel to a second image signal configured to be displayed on the display panel.

Example 10 is directed to the method of any preceding example, wherein the display panel comprises a first edge positioned at an angle with respect to at least one other edge of the display panel.

Example 11 is directed to the method of any preceding example, wherein the second substrate is a color filter substrate.

Example 12 is directed to the method of any preceding example, wherein the second perimeter is smaller than the first perimeter.

Example 13 is directed to a method to convert a pixel of a first display panel to a driver-contact point, the method comprising: uncovering a first pixel of a plurality of pixels on a surface of a display panel, the pixel having a plurality of tracelines including a row traceline and a column traceline to engage the first pixel; electrically exposing the row traceline and the column traceline of the first pixel to thereby form an exposed row traceline and an exposed column traceline; connecting a row driver line to the exposed row traceline; and connecting a column driver line to the exposed column traceline.

Example 14 is directed to the method of example 13, wherein uncovering a first pixel on a surface of a display panel further comprises removing one or more display panel layers to uncover a plurality of electrical tracelines on a substrate surface of the display panel.

Example 15 is directed to the method of examples 13-14, wherein electrically exposing the row traceline further comprises etching the row traceline to remove an insulating layer.

Example 16 is directed to the method of examples 13-15, wherein electrically exposing the row traceline further comprises physically removing an insulating layer covering the row traceline.

Example 17 is directed to the method of examples 13-16, further comprising substantially isolating the column traceline from a first adjacent column traceline.

Example 18 is directed to the method of examples 13-17, wherein substantially isolating the column traceline further comprises forming an opening to isolate the column traceline from the first adjacent column traceline.

Example 19 is directed to the method of examples 13-18, wherein the column driver line comprises communicates with a flex driver line.

Example 20 is directed to the method of examples 13-19, wherein uncovering a first pixel further comprises cutting a display panel from a sheet of pixels to form the display panel, the display panel having a perimeter.

Example 21 is directed to the method of examples 13-120, wherein at least one side of the display panel is at an acute angle with respect to at last one other side of the display panel.

Example 22 is directed to the method of examples 13-21, wherein the display panel defines a backlit display panel.

Example 23 is directed to the method of examples 13-22, wherein the display parameter is smaller than a perimeter of the sheet of pixels.

Example 24 relates to the method of any preceding example, wherein the display panel defines a backlit display panel.

Example 25 relates to a display panel prepared according to the method described in any of the preceding examples.

Example 26 relates to a processor circuitry in communication with a memory circuitry, the memory circuitry comprising instructions, which when executed by the processor circuitry causes one or more devices, including processors, to implement the steps recited in any of the preceding examples.

While the principles of the disclosure have been illustrated in relation to the exemplary embodiments shown herein, the principles of the disclosure are not limited thereto and include any modification, variation or permutation thereof.

I claim:

1. A method to form a custom display from a sheet of pixels, the method comprising:
providing a sheet of pixels having a first substrate, a liquid crystal layer and a second substrate, the sheet of pixels having a first perimeter, and the liquid crystal medium interposed between the first substrate and the second substrate;
forming a display panel from a portion of the sheet of pixels, the display panel having a display panel perimeter, the display panel perimeter including a first edge defined by the first substrate extending beyond the second substrate to thereby expose an electrical trace on the first substrate;
sealing the liquid crystal layer along the first edge;
conductively exposing the electrical trace on the first substrate; and
forming a driver line on the first substrate to communicate a driver signal to the display panel.

2. The method of claim 1, further comprising connecting the driver line on the first substrate to an external driver.

3. The method of claim 2, wherein connecting the column driver line on the first substrate further includes wire-bonding a driver line to the exposed electrical trace.

4. The method of claim 1, wherein the external driver further comprises a scaler configured to convert an incoming image signal for the display panel to a second image signal configured to properly scale an image to be displayed on the display panel.

5. The method of claim 1, wherein conductively exposing the electrical trace further comprises exposing the electrical trace by substantially removing a passivation layer.

6. The method of claim 1, wherein conductively exposing the electrical trace further comprises removing $SiO_2$ from the electrical trace.

7. The method of claim 1, wherein the first substrate extends beyond the second substrate by about 0.5 to 3 mm.

8. The method of claim 1, wherein forming a driver line on the first substrate further comprise laser ablating to define a conductive path on the first substrate.

9. The method of claim 8, further comprising connecting the conductive path with an external column driver and wherein the column driver is configured to scale a first image signal for the display panel to a second image signal configured to properly scale an image to be displayed on the display panel.

10. The method of claim 1, wherein the display panel comprises a first edge positioned at an angle with respect to at least one other edge of the display panel.

11. The method of claim 1, wherein the second substrate is a color filter substrate.

12. The method of claim 1, wherein the second perimeter is smaller than the first perimeter.

* * * * *